(12) United States Patent
Gruenwald et al.

(10) Patent No.: US 11,079,737 B1
(45) Date of Patent: Aug. 3, 2021

(54) ADAPTIVE CONTROL MECHANISM FOR UNCERTAIN SYSTEMS WITH ACTUATOR DYNAMICS

(71) Applicants: Benjamin C. Gruenwald, Evansville, IN (US); Tansel Yucelen, Tampa, FL (US); Kadriye Merve Dogan, Tampa, FL (US); Jonathan A. Muse, Beavercreek, OH (US)

(72) Inventors: Benjamin C. Gruenwald, Evansville, IN (US); Tansel Yucelen, Tampa, FL (US); Kadriye Merve Dogan, Tampa, FL (US); Jonathan A. Muse, Beavercreek, OH (US)

(73) Assignee: University of South Florida, Tampa, FL (US)

(*) Notice: Subject to any disclaimer, the term of this patent is extended or adjusted under 35 U.S.C. 154(b) by 19 days.

(21) Appl. No.: 16/233,666

(22) Filed: Dec. 27, 2018

Related U.S. Application Data

(60) Provisional application No. 62/610,562, filed on Dec. 27, 2017.

(51) Int. Cl.
*G05B 19/408* (2006.01)
(52) U.S. Cl.
CPC ...... *G05B 19/4083* (2013.01); *G05B 2219/49069* (2013.01)
(58) Field of Classification Search
CPC .......... G05B 19/4083; G05B 2219/49069
See application file for complete search history.

(56) References Cited

U.S. PATENT DOCUMENTS

| | | | | |
|---|---|---|---|---|
| 9,296,474 B1* | 3/2016 | Nguyen | ............... | G05B 13/048 |
| 10,216,198 B2* | 2/2019 | Lavretsky | ............ | G05D 1/0891 |
| 2004/0176860 A1* | 9/2004 | Hovakimyan | ....... | G05B 13/027 700/29 |
| 2007/0135939 A1* | 6/2007 | Johnson | ............... | G05B 13/041 700/31 |
| 2011/0161267 A1* | 6/2011 | Chowdhary | ............. | G06N 3/08 706/21 |
| 2013/0061618 A1* | 3/2013 | Wait | ........................ | F25D 29/00 62/89 |
| 2018/0148069 A1* | 5/2018 | Yucelen | ............... | G05B 13/042 |

OTHER PUBLICATIONS

Kaufman et al, "Direct Adaptive Control Algorithms: Theory and Applications", 1994, Springer Verlag, pp. 135. (Year: 1994).*

(Continued)

*Primary Examiner* — Rocio Del Mar Perez-Velez
*Assistant Examiner* — Olvin Lopez Alvarez
(74) *Attorney, Agent, or Firm* — Thomas | Horstemeyer, LLP

(57) ABSTRACT

The present disclosure describes an actuator system comprising an actuator unit that is configured to be positioned next to a structure; and an adaptive controller unit that is configured to receive a command input for the actuator unit and output an actuator command based on a reference model of a physical system that includes the actuator unit and the structure, wherein the actuator command does not alter trajectories of the reference model. In various embodiments, the uncertain dynamical system of the physical system is augmented with the actuator dynamics to provide improved stability.

10 Claims, 5 Drawing Sheets

(56) References Cited

OTHER PUBLICATIONS

Wiese, "Adaptive Control of a Generic Hypersonic Vehicle", 2013, pp. 115, downloaded from the internet https://arc.aiaa.org/doi/abs/10.2514/6.2013-4514 (Year: 2013).*

Lavretsky, "Adaptive Control: Introduction, Overview, and Applications", 2008, pp. 185 downloaded from the internet Adaptive Control: Introduction, Overview, and Applications (Year: 2008).*

Crespo, "Design of a Model Reference Adaptive Controller for an Unmanned Air Vehicle", 2010, pp. 1-12, downlaoded frm the internet https://ntrs.nasa.gov/archive/nasa/casi.ntrs.nasa.gov/20100031112.pdf. (Year: 2010).*

Eric N. Johnson, "Limited Authority Adaptive Flight Control", Georgia Institute of Technology, Nov. 2000, pp. 144.

Gruenwald, et al., "An LMI based hedging approach to model reference adaptive control with actuator dynamics", Proceedings of the ASME 2015 Dynamic Systems and Control Conference, DSCC 2015, Oct. 28-30, 2015, pp. 9.

Johnson, et al., "Limited authority adaptive flight control for reusable launch vehicles", Journal of Guidance, Control, and Dynamics., vol. 26, No. 6, Nov.-Dec. 2003, pp. 8.

Johnson, et al., "Pseudo-control hedging: a new method for adaptive control", Advances in navigation guidance and control technology workshop, Nov. 1-2, 2000, pp. 23.

Johnson, et al., "Feedback linearization with neural network augmentation applied to X-33 attitude control", American Institute of Aeronautics and Astronautics, 2000, pp. 11.

Pomet, et al., "Adaptive nonlinear regulation: estimation from the Lyapunov equation", IEEE transactions on automatic control, vol. 37, No. 6, Jun. 1992, pp. 729-740.

B. C. Gruenwald, J. A Muse, and T. Yucelen, "Adaptive control for a class of uncertain nonlinear dynamical systems in the presence of high-order actuator dynamics," American Control Conference, 2017, pp. 1-7.

B. C. Gruenwald, J. A. Muse, and T. Yucelen, "Adaptive control for a class of uncertain nonlinear dynamical systems in the presence of high-order actuator dynamics," American Control Conference, 2017, pp. 4930-4935.

B. C. Gruenwald, D. Vagner, T. Yucelen, and J. A. Muse, "Computing actuator bandwidth limits for model reference adaptive control ," International Journal of Control, vol. 89, No. 12, pp. 2434-2452, 2016, pp. 2439-2452.

Dogan, et al., "Adaptive architecutres for control of uncertain dynamical systems with actuator and unmodeled dynamics", 2019 John Wiley & Sons, Ltd., Int J. Robust Nonlinear Control, pp. 4228-4249.

B. C. Gruenwald, J. A. Muse, and T. Yucelen, "Adaptive control for a class of uncertain nonlinear dynamical systems the presence of high-order actuator dynamics," American Control Conference, 2017, pp. 4430-4435.

Gruenwald, et al., "Model Reference adaptive control in the presence of order actuator dynamics", 2016 IEEE 55th conference on decision and control, pp. 3807-3812.

Golnaraghi, et al. "Elementary Matrix Theory and Algebra", Access Engineering; McGraw Hill Education, 2017, pp. 14.

Petersen, et al., "The Matrix Cookbook", 2005, pp. 43.

C.A. Rohde, Linear Algebra and Matrices, 2003, pp. 68.

* cited by examiner

ADAPTIVE CONTROL MECHANISM FOR UNCERTAIN SYSTEMS WITH ACTUATOR DYNAMICS

CROSS-REFERENCE TO RELATED APPLICATION

This application claims priority to U.S. provisional application entitled, "An Adaptive Control Mechanism for Uncertain Systems with Actuator Dynamics," having Ser. No. 62/610,562, filed Dec. 27, 2017, which is entirely incorporated herein by reference.

STATEMENT REGARDING FEDERALLY SPONSORED RESEARCH OR DEVELOPMENT

This invention was made with government support under Grant Numbers FA8650-16-C-2642 awarded by the Air Force Research Lab and 17-S8401-02-C1 awarded by the Universal Technology Corporation-Air Force Research Lab. The Government has certain rights in the invention.

BACKGROUND

In adaptive control of uncertain dynamical systems with actuator dynamics, a well-known practical method is pseudo-control hedging. Based on a given reference model capturing a desired closed-loop dynamical system performance, the hedging approach alters the trajectories of this model to enable adaptive controllers to be designed such that their stability is not affected by the presence of actuator dynamics. In the present disclosure, a new adaptive control architecture or structure for uncertain dynamical systems with actuator dynamics is presented.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
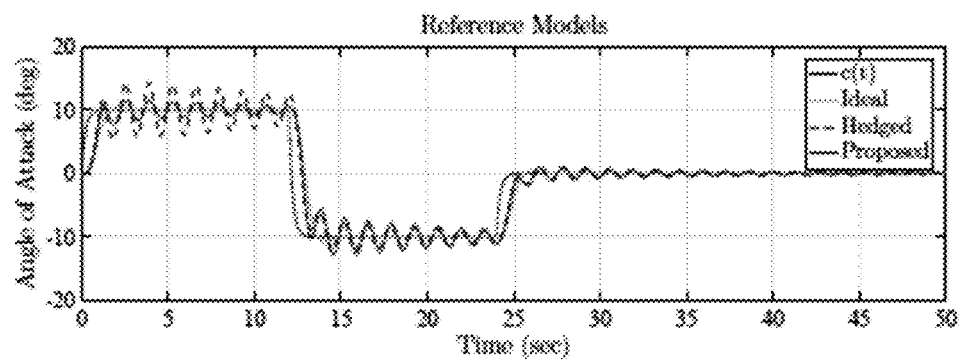
FIGS. 1A-C are plots showing an exemplary controller performance in accordance with embodiments of the present disclosure against a hedging based controller performance with respect to angle of attack measurements over time at a minimum calculated actuator bandwidth value of 7.96.
Figure 1B:
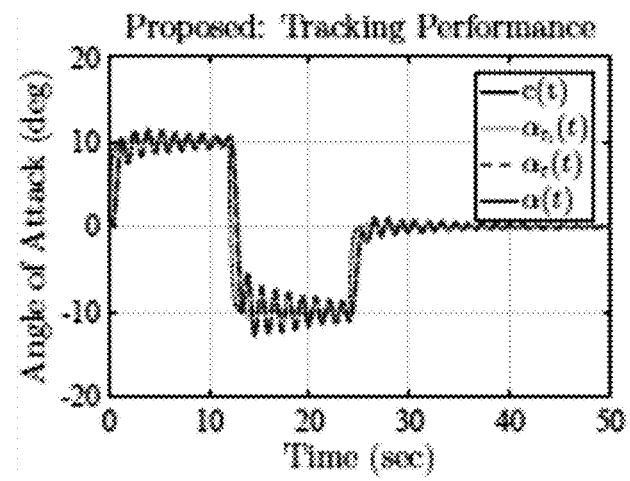
Figure 1C:
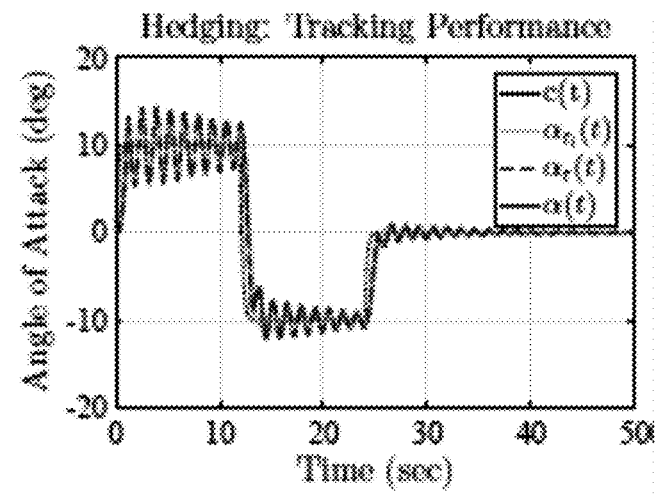
Figure 2A:
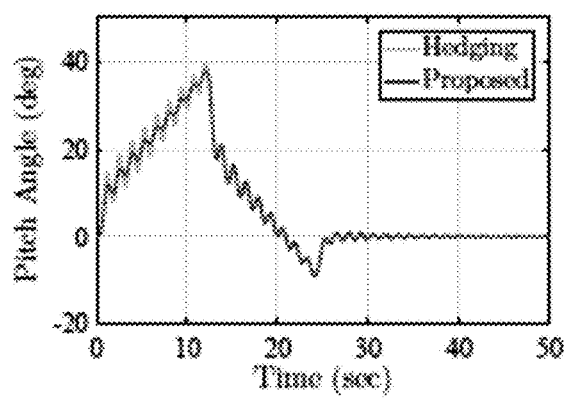
FIGS. 2A-C are plots showing an exemplary controller performance in accordance with embodiments of the present disclosure against a hedging based controller performance with respect to pitch angle, pitch rate, and control and actuator measurements over time at a minimum calculated actuator bandwidth value of 7.96.
Figure 2B:
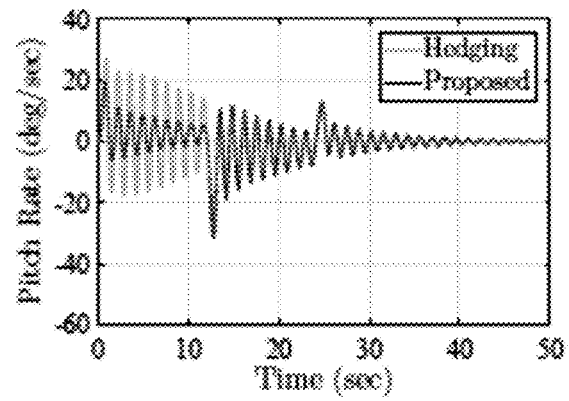
Figure 2C:
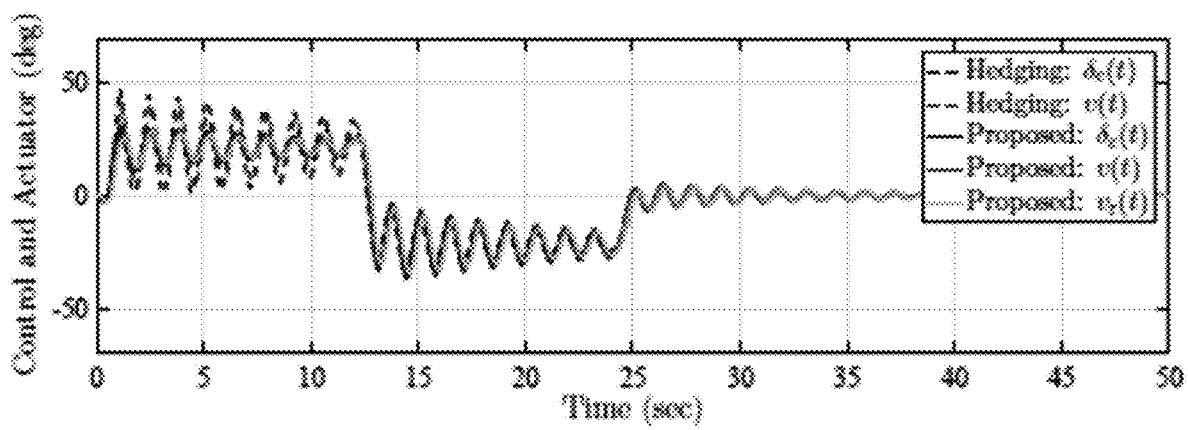

In accordance with the present disclosure, we present new adaptive control systems and methods for uncertain dynamical systems with actuator dynamics. Specifically, both for stabilization and command following cases, we analyze the stability of an adaptive control system architecture or structure using tools and methods from linear matrix inequalities and Lyapunov theory. Next, we theoretically show that the architecture, in accordance with an exemplary embodiment, does not significantly alter the trajectories of the given reference model as compared with the hedging approach, where this is practically important owing to the fact that the architecture can lead to better closed-loop dynamical system performance. Finally, we illustrate the performance of the architecture, in accordance with an exemplary embodiment, through a numerical example on a hypersonic vehicle model and compare our results with the hedging approach.

As discussed, for pseudo-control hedging, a given reference model captures a desired closed-loop dynamical system performance, and based on the model, the hedging approach alters the trajectories of this model to enable adaptive controllers to be designed such that their stability is not affected by the presence of actuator dynamics. While the hedging approach is introduced to the literature around the 2000s, recent papers show generalizations to this approach as well as sufficient stability conditions predicated on linear matrix inequalities (LMIs). In particular, considering the actuator dynamics of interest, when the solution to the resulting LMIs is feasible, then stability of the closed-loop dynamical system is guaranteed. In the present disclosure, a new adaptive control architecture for uncertain dynamical systems with actuator dynamics is presented.

The notation used in this paper is fairly standard. For self-containedness, note that $\mathbb{R}$ denotes the set of real numbers, $\mathbb{R}^n$ denotes the set of $n \times 1$ real column vectors, $\mathbb{R}^{n \times m}$ denotes the set of $n \times m$ real matrices, $\mathbb{R}_+$ (respectively, $\bar{\mathbb{R}}_+$) denotes the set of positive (respectively, non-negative) real numbers, $\mathbb{R}_+^{n \times n}$ (respectively, $\bar{\mathbb{R}}_+^{n \times n}$) denotes the set of $n \times n$ positive-definite (respectively, non-negative-definite) real matrices, $\mathbb{D}^{n \times n}$ denotes the set of $n \times n$ real matrices with diagonal scalar entries, and "$\triangleq$" denotes equality by definition. In addition, we write $(\cdot)^T$ for the transpose operator, $(\cdot)^{-1}$ for the inverse operator, $\det(\cdot)$ for the determinant operator, $\text{tr}(\cdot)$ for the trace operator, and $\|\cdot\|_2$ for the Euclidean norm.

Mathematical Preliminaries

In this section, we present a concise overview of the standard model reference adaptive control problem in the absence of actuator dynamics. Consider the uncertain dynamical system given by $$\dot{x}_p(t) = A_p x_p(t) + B_p[u(t) + W^T x_p(t)], \quad x_p(0) = x_{p0}, \quad (1)$$

where $x_p(t) \in \mathbb{R}^{n_p}$ is a measurable state and $u(t) \in \mathbb{R}^m$ is a control input. In addition, $A_p \in \mathbb{R}^{n_p \times n_p}$ is a known system matrix, $B_p \in \mathbb{R}^{n_p \times m}$ is a known control input matrix, and $W \in \mathbb{R}^{n_p \times m}$ is an unknown weight matrix. In Equation (1), it is implicitly assumed that the pair $(A_p, B_p)$ is controllable. To address command following, let $c(t) \in \mathbb{R}^{n_c}$ be a given piecewise continuous command (i.e., reference) and $x_c(t) \in \mathbb{R}^{n_c}$ be the integrator state satisfying $$\dot{x}_c(t) = E_p x_p(t) - c(t), \quad x_c(0) = x_{c0}, \quad (2)$$

Here, $E_p \in \mathbb{R}^{n_c \times n_p}$ allows the selection of a subset of $x_p(t)$ to follow $c(t)$. In the light of the above definitions, Equations (1) and (2) can be augmented as $$\dot{x}(t) = Ax(t) + B[u(t) + W^T x_p(t)] + B_r c(t), \quad x(0) = x_0, \quad (3)$$

where $x(t) \triangleq [x_p^T(t), x_c^T(t)]^T \in \mathbb{R}^n$, $n = n_p + n_c$ is the augmented state vector, $$x_0 = [x_{p_0}^T, x_{c_0}^T]^T \in \mathbb{R}^n,$$

$$A \triangleq \begin{bmatrix} A_p & 0_{n_p \times n_c} \\ E_p & 0_{n_c \times n_c} \end{bmatrix} \in \mathbb{R}^{n \times n}, \quad (4)$$

$$B \triangleq [B_p^T, 0_{m \times n_p}]^T \in \mathbb{R}^{n \times m}, \quad (5)$$

$$B_r \triangleq [0_{n_c \times n_{p'}}, -I_{n_c \times n_c}]^T \in \mathbb{R}^{n \times n_c}, \quad (6)$$

Next, consider the reference model capturing a desired (i.e., ideal) closed-loop dynamical system performance given by $$\dot{x}_r(t) = A_r x(t) + B_r c(t), \quad x_r(0) = x_{r_0}, \quad (7)$$

where $x_r(t) \in \mathbb{R}^n$ is the reference state vector and $A_r \in \mathbb{R}^{n \times n}$ is the Hurwitz reference model matrix. The classical objective of the model reference adaptive control problem is to construct an adaptive feedback control law such that the state vector $x(t)$ closely follows the reference state vector $x_r(t)$ in the presence of system uncertainties captured by the term "$W^T x_p(t)$" in Equation (1). For addressing this problem when the actuator dynamics is not present, consider the feedback control law given by $$u(t) = u_n(t) + u_a(t), \quad (8)$$

where $u_n(t)$ and $u_a(t)$ are the nominal and the adaptive feedback control laws, respectively.

In Equation (8), let the nominal feedback control law be given by $$u_n(t) = -Kx(t), \quad K \in \mathbb{R}^{m \times m}, \quad (9)$$

such that $A_r \triangleq A - BK$ holds. Using Equations (8) and (9) in Equation (3) yields $$\dot{x}(t) = A_r x(t) + B_r c(t) + B[u_a(t) + W^T x_p(t)], \quad (10)$$

Motivated from the structure of Equation (10), the adaptive feedback control law in Equation (8) is now given by $$u_a(t) = -\hat{W}^T(t) x_p(t), \quad (11)$$

where $\hat{W}(t) \in \mathbb{R}^{n_p \times m}$ is the estimate of $W$ satisfying the weight update law $$\dot{\hat{W}}(t) = \gamma \text{Proj}_m[\hat{W}(t), x_p(t) e^T(t) PB] \quad \hat{W}(0) = \hat{W}_0, \quad (12)$$

with $\gamma \in \mathbb{R}_+$ being the learning rate, $e(t) \triangleq x(t) - x_r(t)$ being the system error state vector, and $P \in \mathbb{R}_+^{n \times n}$ being the solution of the Lyapunov equation given by $$0 = A_r^T P + PA_r + R, \quad (13)$$

$R \in \mathbb{R}_+^{n \times n}$. In Equation (12), the projection operator is used, and hence, we need its definition at Equation [13].

Definition 1 (Projection Operator).

Let $\Omega = \{\theta \in \mathbb{R}^n : (\theta_i^{min} \leq \theta_i \leq \theta_i^{max})_{i=1,2,\ldots,n}\}$ be a convex hypercube in $\mathbb{R}^n$, where $(\theta_i^{min}, \theta_i^{max})$ represent the minimum and maximum bounds for the $i^{th}$ component of the n-dimensional parameter vector $\theta$. In addition, let $\Omega_\epsilon = \{\theta \in \mathbb{R}^n : (\theta_i^{min} + \epsilon \leq \theta_i \leq \theta_i^{max} - \epsilon)_{i=1,2,\ldots,n}\}$ be a second hypercube for a sufficiently small positive constant $\epsilon$, where $\Omega_\epsilon \subset \Omega$.

With $y \in \mathbb{R}^n$, $y \in \mathbb{R}^n$, the projection operator $\text{Proj}: \mathbb{R}^n \times \mathbb{R}^n \to \mathbb{R}^n$ is then defined compenent-wise by $$\text{Proj}(\theta, y) \triangleq \begin{cases} \left(\frac{\theta_i^{max} - \theta_i}{\epsilon}\right) y_i, & \text{if } \theta_i > \theta_i^{max} - \epsilon \text{ and } y_i > 0, \\ \left(\frac{\theta_i - \theta_i^{min}}{\epsilon}\right) y_i, & \text{if } \theta_i < \theta_i^{min} + \epsilon \text{ and } y_i < 0, \\ y_i, & \text{otherwise} \end{cases} \quad (14)$$

In the light of Definition 1 (Projection Operator), it follows that $\text{roj}(\theta - \theta^*)^T (\text{Proj}(\theta, y) - y) \leq 0$, $\theta^* \in \mathbb{R}^n$. Note that this definition can also be generalized to matrices as $\text{Proj}_m(\Theta, Y) = (\text{Proj}(\text{col}_1(\Theta), \text{col}_1(Y)), \ldots, \text{Proj}(\text{col}_m(\Theta), \text{col}_m(Y)))$, where $\Theta \in \mathbb{R}^{n \times m}$, $Y \in \mathbb{R}^{n \times m}$ and $\text{col}_i(\cdot)$ denotes ith column operator. In particular, for a given $\Theta^* \in \mathbb{R}^{n \times m}$, it follows from $\text{Proj}(\theta - \theta^*)^T (\text{Proj}(\theta, y) - y) \leq 0$ that $[(\Theta - \Theta^*)^T (\text{Proj}_m(\Theta, Y) - Y)] = \sum_{i=1}^{m} [\text{col}_i(\Theta - \Theta^*)^T (\text{Proj}(\text{col}_i(\Theta), \text{col}_i(Y)) - \text{col}_i(Y))] \leq 0$. Now, with regard to Equation (12), the projection bounds are defined such that $|[\hat{W}(t)]_{ij}| \leq \hat{W}_{max, i+(j-1)n_p}$ for $i = 1, \ldots, n_p$ and $j = 1, \ldots, m$, where $\hat{W}_{max, i+(j-1)n_p} \in \mathbb{R}_+$ denotes symmetric element-wise projection bounds. Furthermore, the following remarks are immediate.

Remark 1 (Adaptive Command Following in the Absence of Actuator Dynamics).

Using Equation (11) in Equation (10) along with Equation (7), the system error dynamics can be written as $$\dot{e}(t) = A_r e(t) - B\tilde{W}^T(t) x_p(t), \quad e(0) = e_0, \quad (15)$$

where $\tilde{W}(t) \triangleq \hat{W}(t) - W \in \mathbb{R}^{n_p \times m}$. From Equation (15), the weight update law (Equation 12) can now be derived using the Lyapunov function $= \mathcal{V}(e, \tilde{W}) = e^T Pe + \gamma^{-1} \text{tr} \tilde{W}^T \tilde{W}$. Specifically, from the time derivative of this Lyapunov function, i.e., $\dot{\mathcal{V}}(e(t), \tilde{W}(t)) \leq -e^T(t) Re(t) \leq 0$, one can conclude the boundedness of the pair $(e(t), \tilde{W}(t))$ as well as $\lim_{t \to \infty} \dot{\mathcal{V}}(e(t), \tilde{W}(t)) = 0$, where the latter results from Barbalat's lemma.

Remark 2 (Adaptive Stabilization in the Absence of Actuator Dynamics).

If the main objective is to stabilize the uncertain dynamical system given by Equation (1), the above command following formulation can be simplified since Equation (2) is not necessarily needed in this case. In particular, the feedback control law becomes $u(t) = -K_p x_p(t) - \hat{W}^T(t) x_p(t)$, such that $A_p - B_p K_p$ is Hurwitz and $\hat{W}(t) \in \mathbb{R}^{n_p \times m}$ is the estimate of $W$ satisfying the weight update law $\dot{\hat{W}}(t) = \gamma_p \text{Proj}_m[\hat{W}(t), x_p(t) x_p^T(t) P_p B_p]$, where $\gamma_p \in \mathbb{R}_+$ is the learning gain and $P_p \in \mathbb{R}_+^{n_p \times n_p}$ is the solution of the Lyapunov equation $0 = (A_p - B_p K_p)^T P_p + P_p (A_p - B_p K_p) + R_p$ for a given $R_p \in \mathbb{R}_+^{n_p \times n_p}$. Stabilization can then be shown by considering the Lyapunov function $\mathcal{V}(x_p, \tilde{W}) = x_p^T P x_p + \gamma_p^{-1} \text{tr} \tilde{W}^T \tilde{W}$ and following the identical steps described in the above remark.

Remark 1 (Adaptive Command Following in the Absence of Actuator Dynamics) and Remark 2 (Adaptive Stabilization in the Absence of Actuator Dynamics) no longer hold for adaptive control of uncertain dynamical systems with actuator dynamics. Thus, the next section presents a new model reference adaptive control architecture for stabilization and command following cases in the presence of actuator dynamics.

An Exemplary Proposed Approach.

Based on the mathematical preliminaries covered in the previous section, we first introduce the actuator dynamics problem. For this purpose, consider the uncertain dynamical system given by $$\dot{x}_p(t) = A_p x_p(t) + B_p[\mathcal{V}(t) + W^T x_p(t)], \quad x_p(0) = x_{p0}, \quad (16)$$

where $\mathcal{V}(t) \in \mathbb{R}^m$ is the actuator output of the actuator dynamics $G_A$ (available for feedback as in the hedging approach) satisfying $$\dot{\mathcal{V}}(t) = -M(\mathcal{V}(t) - u(t)), \quad \mathcal{V}(0) = \mathcal{V}_0, \quad (17)$$

Here, $M \in \mathbb{R}^{m \times m} \cap \mathbb{D}^{m \times m}$ has diagonal entries $\lambda_{i,i} > 0$, $i = 1, \ldots, m$, which represent the actuator bandwidth of each control channel. The remainder of this section is divided into two subsections devoted for adaptive stabilization and command following cases.

Adaptive Stabilization with Actuator Dynamics.

In this section, we design an adaptive feedback control law to stabilize the uncertain dynamical system (Equation 16) subject to the actuator dynamics (Equation 17). For this purpose, let the feedback control law be given by $$u(t) = -K_p x_p(t) - \hat{W}^T(t) x_p(t), \quad (18)$$

where $K_p \in \mathbb{R}^{m \times n_p}$ is a nominal gain matrix designed such that $A_p - B_p K_p$ is Hurwitz and $\hat{W}(t) \in \mathbb{R}^{n_p \times m}$ is the estimate of $W$ satisfying the weight update law $$\dot{\hat{W}}(t) = \gamma_p \text{Proj}_m[\hat{W}(t), \sigma_p(\cdot) PG], \quad \hat{W}(0) = \hat{W}_{p0}, \quad (19)$$

where $\gamma_p \in \mathbb{R}_+$ is the learning rate, $\sigma_p(\cdot) = [x_p(t) x_p^T(t), x_p(t) \mathcal{V}^T(t)] \in \mathbb{R}^{n_p \times (n_p + m)}$, $P \in \mathbb{R}_+^{(n_p+m) \times (n_p+m)}$ is a solution of an LMI for which further details are given below, and $G = [B_p^T, 0_{m \times m}]^T \in \mathbb{R}^{(n_p+m) \times m}$. In addition, the projection bounds are defined such that $$|[\hat{W}(t)]_{ij}| \leq \hat{W}_{max, i+(j-1)n_p}, \quad (20)$$

for $i = 1, \ldots, n_p$ and $j = 1, \ldots, m$. It then follows that Equation (17) can be rewritten using Equation (18) as $$\dot{\mathcal{V}}(t) = -M\mathcal{V}(t) - M(K_p + \hat{W}^T(t)) x_p(t). \quad (21)$$

Consider now, by adding and subtracting $B_p \hat{W}^T(t) x_p(t)$, an equivalent form of Equation (16) given by $$\dot{x}_p(t) = (A_p + B_p \hat{W}^T(t)) x_p(t) + B_p \mathcal{V}(t) - B_p \tilde{W}^T(t) x_p(t), \quad (22)$$

where $\tilde{W}(t) \triangleq \hat{W}(t) - W$. It follows that Equations (21) and (22) can be written compactly as $$\dot{z}_p(t) = F(\hat{W}(t)) z_p(t) - G \tilde{W}_p^T(t) x_p(t), \quad (23)$$

where $z_p(t) \triangleq [x_p^T(t), \mathcal{V}^T(t)]^T$ and $$F(\hat{W}(t)) = \begin{bmatrix} A_p + B_p \hat{W}^T(t) & B_p \\ -M(K_p + \hat{W}^T(t)) & -M \end{bmatrix}. \quad (24)$$

Various results are now presented.

Theorem 1 (Adaptive Stabilization with Actuator Dynamics).

Consider the uncertain dynamical system given by Equation (16), the actuator dynamics given by Equation (17), the feedback control law given by Equation (18), and the update law given by Equation (19). In addition, let $$A(\hat{W}(t), M, \epsilon) = \begin{bmatrix} A_p + B_p \hat{W}^T(t) + \frac{\epsilon}{2}I & B_p \\ -M(K_p + \hat{W}^T(t)) & -M + \frac{\epsilon}{2}I \end{bmatrix} \quad (25)$$

be quadratically stable with $\epsilon \in \mathbb{R}_+$ being a design parameter. Then, the solution $(z_p(t), \hat{W}(t))$ of the closed-loop dynamical system is bounded, $\lim_{t \to \infty} x_p(t) = 0$, and $\lim_{t \to \infty} \mathcal{V}(t) = 0$.

Remark 3 (LMI Analysis for Stabilization).

In Theorem 1 (Adaptive Stabilization with Actuator Dynamics), we assume that Equation (25) is quadratically stable. Using LMIs, we can satisfy the quadratic stability of Equation (25) for given projection bounds $\hat{W}_{max}$ for the elements of $\hat{W}(t)$, the bandwidths of the actuator dynamics $M$, and the design parameter $\epsilon$. To elucidate this important point, let $\overline{W}_{i_1, \ldots, i_l} \in \mathbb{R}^{n_p \times m}$ be defined as $$W = \begin{bmatrix} (-1)^{i_1} \hat{W}_{max,1} & (-1)^{i_1+n_p} \hat{W}_{max,1+n_p} & \cdots & (-1)^{i_1+(m-1)n_p} \hat{W}_{max,1+(m-1)n_p} \\ (-1)^{i_2} \hat{W}_{max,2} & (-1)^{i_2+n_p} \hat{W}_{max,2+n_p} & \cdots & (-1)^{i_2+(m-1)n_p} \hat{W}_{max,2+(m-1)n_p} \\ \vdots & \vdots & \ddots & \vdots \\ (-1)^{i_{n_p}} \hat{W}_{max,n_p} & (-1)^{i_{2n_p}} \hat{W}_{max,2n_p} & \cdots & (-1)^{i_{mn_p}} \hat{W}_{max,mn_p} \end{bmatrix} \quad (26)$$

where $i_1 \in \{1, 2\}$, $l \in \{1, \ldots, 2^{mn_p}\}$, such that $\overline{W}_{i_1, \ldots, i_l}$ represents the corners of the hypercube defining the maximum variation of $\hat{W}(t)$, and let $$A_{i_1, \ldots, i_l} = \begin{bmatrix} A_p + B_p \overline{W}_{i_1, \ldots, i_l}^T + \frac{\varepsilon}{2}I & B_p \\ -M(K_p + \overline{W}_{i_1, \ldots, i_l}^T) & -M + \frac{\varepsilon}{2}I \end{bmatrix}, \quad (27)$$

be the corners of the hypercube constructed from all the permutations of $\overline{W}_{i_1, \ldots, i_l}$. For a given $M$, it can then be shown that $$A_{i_1, \ldots, i_l}^T P + P A_{i_1, \ldots, i_l} < 0, \quad P \geq 0, \quad (28)$$

implies that $A^T(\hat{W}(t), M, \epsilon)P + PA(\hat{W}(t), M, \epsilon) < 0$; thus, one can solve the LMI given by Equation (28) to calculate $P$, which is then used in the weight update law (Equation 19).

Alternatively, if one is interested in finding the minimum value of M such that $A^T(\hat{W}(t), M, \epsilon)P + PA(\hat{W}(t), M, \epsilon) < 0$ holds, we note the following. Let $$S \triangleq \begin{bmatrix} I_{n_p \times n_p} & 0_{n_p \times m} \\ 0_{m \times n_p} & M \end{bmatrix}. \tag{29}$$

Since $\xi^T[A^T(\hat{W}(t), M, \epsilon)P + PA(\hat{W}(t), M, \epsilon)]\xi < 0$ for all $\xi \neq 0$, $\det(S) \neq 0$, and $\xi^T[A^T(\hat{W}(t), M, \epsilon)P + PA(\hat{W}(t), M, \epsilon)]\xi = \xi^T S^{-1}[\overline{A}^T(\hat{W}(t), M, \epsilon)\overline{P} + \overline{P}\overline{A}(\hat{W}(t), M, \epsilon)]S^{-1}\xi < 0$, one can equivalently show $$\overline{A}^T(\hat{W}(t), M, \epsilon)\overline{P} + \overline{P}\overline{A}(\hat{W}(t), M, \epsilon) < 0, \quad \overline{P} > 0, \tag{30}$$

where $$\overline{A}(\hat{W}(t), M, \epsilon) = \begin{bmatrix} A_p + B_p \hat{W}^T(t) + \frac{\epsilon}{2}I & B_p M \\ -K_p - \hat{W}^T(t) & -M + \frac{\epsilon}{2}I \end{bmatrix}, \tag{31}$$

and $\overline{P} = SPS$, where $\overline{P} > 0$ implies $P > 0$ and vice versa. Similar to the above discussion, for $$\overline{A}_{i_1, \ldots, i_l} \triangleq S^{-1} A_{i_1, \ldots, i_l} S = \begin{bmatrix} A_p + B_p \overline{W}^T_{i_1, \ldots, i_l} + \frac{\epsilon}{2}I & B_p M \\ -K_p - \overline{W}^T_{i_1, \ldots, i_l} & -M + \frac{\epsilon}{2}I \end{bmatrix}, \tag{32}$$

the matrix inequality $$\overline{A}_{i_1, \ldots, i_l}^T \overline{P} + \overline{P}\overline{A}_{i_1, \ldots, i_l} < 0, \overline{P} > 0, \tag{33}$$

implies that $\overline{A}^T(\hat{W}(t), M, \epsilon)\overline{P} + \overline{P}\overline{A}(\hat{W}(t), M, \epsilon) < 0$. We can then cast Equation (33) as a convex optimization problem as
minimize M;
subject to Equation (33);
such that the minimum actuator bandwidth M can be computed for given projection bounds $\hat{W}_{max}$ and the user defined parameter $\epsilon$. For the resulting minimum M, the solution P is then used in a weight update law for Equation (19) as $P = S^{-1}\overline{P}S^{-1}$.

For the case of stabilization, it is seen that by augmenting the uncertain dynamical system with the actuator dynamics, a convenient quadratic stability condition can be used to prove stability and allow for computation of minimum actuator bandwidth values. In the next section, we design a reference model motivated from this quadratically stable matrix structure to achieve improved command following performance.

Adaptive Command Following with Actuator Dynamics: Beyond Pseudo-Control Hedging.

Building upon the results of the previous section, for adaptive command following, we incorporate the integrator dynamics given by Equation (2) with the uncertain dynamical system subject to actuator dynamics given by Equation (16) such that the augmented dynamics are given by $$\dot{x}(t) = Ax(t) + B_r c(t) + B[\mathcal{V}(t) + W^T x_p(t)], \quad x(0) = x_0, \tag{34}$$

where $x(t) \triangleq [x_p^T(t), x_c^T(t)]^T \in \mathbb{R}^n$, $n = n_p + n_c$, is the augmented stated vector, and A, B, and $B_r$ are given by Equations (4)-(6) respectively.

Motivated by the results of previous section, we consider the reference model using an actuator model as $$\begin{bmatrix} \dot{x}_r(t) \\ \dot{v}_r(t) \end{bmatrix} = \begin{bmatrix} A + B\hat{W}^T(t)N & B \\ -M(K + \hat{W}(t)N) & -M \end{bmatrix} \begin{bmatrix} x_r(t) \\ v_r(t) \end{bmatrix} + \begin{bmatrix} B_r \\ 0_{m \times n_c} \end{bmatrix} c(t), \tag{35}$$

where $N = [I_{n_p \times n_p}, 0_{n_p \times n_c}] \in \mathbb{R}^{n_p \times n}$, $K \in \mathbb{R}^{m \times n}$ is designed such that $A_r = A - BK$ is Hurwitz and $\hat{W}(t) \in \mathbb{R}^{n_p \times m}$ is an estimate of W for which the weight update law will be introduced later. Now, using $z_r(t) \triangleq [x_r^T(t), \mathcal{V}_r^T(t)]^T$, $B_{r0} = [B_r^T, 0_{m \times n_c}^T]^T$, and $$F_r(\hat{W}(t)) = \begin{bmatrix} A + B\hat{W}^T(t)N & B \\ -M(K + \hat{W}^T(t)N) & -M \end{bmatrix}, \tag{36}$$

we can write Equation (35) compactly as $$\dot{z}_r(t) = F_r(\hat{W}(t))z_r(t) + B_{r0}c(t) \tag{37}$$

To achieve tracking of the considered reference model Equation (37), let the feedback control law be given by $$u(t) = -Kx(t) - \hat{W}^T(t)Nx(t), \tag{38}$$

where $\hat{W}(t)$ satisfies the weight update law $$\dot{\hat{W}}(t) = \gamma \text{Proj}_m[\hat{W}(t), \sigma(\cdot)PG], \hat{W}(0) = \hat{W}_0, \tag{39}$$

with $\gamma \in \hat{W}_+$ being the learning rate, $\sigma(\cdot) = [Nx(t)e_x^T(t), Nx(t)e\mathcal{V}^T(t)] \in \hat{W}^{n_p \times (n+m)}$, $e_x(t) \triangleq x(t) - x_r(t)$ being the system error state vector, $e\mathcal{V}(t) \triangleq \mathcal{V}(t) - \mathcal{V}_r(t)$ being the actuator output error, $P \in \hat{W}_+^{(n+m) \times (n+m)}$ being a solution of a matrix inequality for which further details are given below, and $G = [B^T, 0_{m \times m}]^T \in \hat{W}^{(n+m) \times m}$. In addition, the projection bounds are defined such that $$|[\hat{W}(t)]_{ij}| \leq \hat{W}_{max, i + (j-1)n_p}, \tag{40}$$

for $i = 1, \ldots, n_p$ and $j = 1, \ldots, m$.

Now, using Equation (38) in Equation (17) and adding and subtracting $B\hat{W}^T(t)Nx(t)$ to Equation (37), we can write the augmented uncertain system dynamics and actuator dynamics compactly as $$\dot{z}(t) = F_r(\hat{W}(t))z(t) + B_{r0}c(t) - G\tilde{W}^T(t)Nx(t), \tag{41}$$

where $z(t) \triangleq [x^T(t), \mathcal{V}^T(t)]^T$. Defining the augmented error $e_z(t) \triangleq z(t) - z_r(t)$, the error dynamics follow from Equation (41) and Equation (37) as $$\dot{e}_z(t) = F_r(\hat{W}(t))e_z(t) - G\tilde{W}^T(t)Nx(t), e_z(0) = e_{z0}, \tag{42}$$

where $\tilde{W}(t) = \hat{W}(t) - W \in \mathbb{R}^{n_p \times m}$. Accordingly, an additional result of the present disclosure is provided below.

Theorem 2 (Adaptive Command Following with Actuator Dynamics).

Consider the uncertain dynamical system given by Equation (16), the integrator dynamics given by Equation (2), the actuator dynamics given by Equation (17), the reference model given by Equation (35), the feedback control law given by Equation (38), and the update law given by Equation (39). In addition, let $$A(\hat{W}(t), M, \epsilon) = \begin{bmatrix} A + B\hat{W}^T(t)N + \frac{\epsilon}{2}I & B \\ -M(K + \hat{W}^T(t)N) & -M + \frac{\epsilon}{2}I \end{bmatrix}, \quad (43)$$

be quadratically stable with $\epsilon \in \mathbb{R}_+$ being a design parameter. Then, the solution $(e_z(t), \tilde{W}(t))$ of the closed-loop dynamical system is bounded, $\lim_{t \to \infty} e_x(t)=0$, and $\lim_{t \to \infty} e_{\mathcal{V}}(t)=0$.

Remark 4 (LMI Analysis for Command Following).

Similar to the preceding Remark 3 (LMI Analysis for Stabilization), we can satisfy the quadratic stability of Equation (43) using LMIs. In this case, let $$A_{i_1, \ldots, i_l} = \begin{bmatrix} A + B\overline{W}^T_{i_1, \ldots, i_l}(t)N + \frac{\epsilon}{2}I & B \\ -M(K + W^T_{i_1, \ldots, i_l}(t)N) & -M + \frac{\epsilon}{2}I \end{bmatrix}, \quad (44)$$

be the corners of the hypercube constructed from all the permutations of $\overline{W}_{i_1, \ldots, i_l}$, which is given by Equation (26). For a given M, it can then be shown that $$A_{i_1, \ldots, i_l}^T P + P A_{i_1, \ldots, i_l} < 0, P = P^T > 0, \quad (45)$$

implies that $A^T(\hat{W}(t), M, \epsilon)P + PA(\hat{W}(t), M, \epsilon) < 0$; thus, one can solve the LMI given by Equation (45) to calculate P, which is then used in the weight update law for Equation (39).

Once again, as in the previous Remark 3 (LMI Analysis for Stabilization), one can alternatively find the minimum value of M such that $A^T(\hat{W}(t), M, \epsilon)P + PA(\hat{W}(t), M, \epsilon) < 0$ holds. For this purpose, let $$S_c \triangleq \begin{bmatrix} I_{n \times n} & 0_{n \times m} \\ 0_{m \times n} & M \end{bmatrix}. \quad (46)$$

Since $\xi^T[A^T(\hat{W}(t), M, \epsilon)P + PA(\hat{W}(t), M, \epsilon)]\xi < 0$ for all $\xi \neq 0$, $\det(S_c) \neq 0$, and $\xi^T[A^T(\hat{W}(t), M, \epsilon)P + PA(\hat{W}(t), M, \epsilon)]\xi = \xi^T S_c^{-1}[\overline{A}^T(\hat{W}(t), M, \epsilon)\overline{P} + \overline{P}\overline{A}(\hat{W}(t), M, \epsilon)]S_c^{-1}\xi < 0$, one can equivalently show $$\overline{A}^T(\hat{W}(t), M, \epsilon)\overline{P} + \overline{P}\overline{A}(\hat{W}(t), M, \epsilon) < 0, \overline{P} > 0, \text{ where} \quad (47)$$

$$\overline{A}^T(\hat{W}(t), M, \epsilon) = \begin{bmatrix} A + B\hat{W}^T(t)N + \frac{\epsilon}{2}I & BM \\ K - \hat{W}^T(t)N & -M + \frac{\epsilon}{2}I \end{bmatrix}, \quad (48)$$

and $\overline{P} = SPS$, where $\overline{P} > 0$ implies $P > 0$. For $$\overline{A}_{i_1, \ldots, i_l} \triangleq S_c^{-1} A_{i_1, \ldots, i_l} S_c = \begin{bmatrix} A + B\overline{W}^T_{i_1, \ldots, i_l}(t)N + \frac{\epsilon}{2}I & BM \\ -K - \overline{W}^T_{i_1, \ldots, i_l}N & -M + \frac{\epsilon}{2}I \end{bmatrix}, \quad (49)$$

the matrix inequality $$\overline{A}_{i_1, \ldots, i_l}^T \overline{P} + \overline{P}\overline{A}_{i_1, \ldots, i_l} < 0, \overline{P} > 0, \quad (50)$$

implies that $\overline{A}^T(\hat{W}(t), M, \epsilon)\overline{P} + \overline{P}\overline{A}(\hat{W}(t), M, \epsilon) < 0$, such that a convex optimization problem can be set up to compute the minimum actuator bandwidth M for given projection bounds $\hat{W}_{max}$ and the user defined parameter $\epsilon$. For the resulting minimum M, the solution P is used in the proposed weight update law of Equation (39) (42) as $P = S_c^{-1} \overline{P} S_c^{-1}$.

Remark 5 (Comparison with Hedging Approach).

The hedging framework used in conventional systems alters a given reference model trajectory with a hedging term, allowing for "correct" adaptation in the presence of actuator dynamics. Specifically, the reference model is given by $$x(t) = [\text{Ideal Reference Model}] + [\text{Hedging Term}] = [A_r x_r(t) + B_r c(t)] + [B(\mathcal{V}(t) - u(t))], x_r(0) = x_{r0} \quad (51)$$

This is then written compactly with the actuator dynamics $\dot{v}(t) = -M(\mathcal{V}(t) - u(t))$ and the feedback control law $u(t) = -Kx(t) - \hat{W}(t)Nx(t)$ as $$\begin{bmatrix} \dot{x}_r(t) \\ \dot{v}_r(t) \end{bmatrix} = \begin{bmatrix} A + B\hat{W}^T(t)N & B \\ -M(K + \hat{W}(t)N) & -M \end{bmatrix} \begin{bmatrix} x_r(t) \\ v_r(t) \end{bmatrix} + \begin{bmatrix} B_r \\ 0_{m \times n_c} \end{bmatrix} c(t) + \begin{bmatrix} B(K + \hat{W}^T(t)N)e(t) \\ -(K + \hat{W}^T(t)N)e(t) \end{bmatrix}$$

$$= F_r(\hat{W}(t)) \begin{bmatrix} x_r(t) \\ v_r(t) \end{bmatrix} + B_{r0} c(t) + \phi(e(t)). \quad (52)$$

Due to this hedging term in the reference model (Equation 51), we use LMIs to show $F_r(\hat{W}(t))$ is quadratically stable, and therefore, the reference model state $x_r(t)$ is bounded.

The benefit of an exemplary architecture of this disclosure is that the designed reference model as given by Equation (35) does not contain the additional $\phi(e(t))$ term as in Equation (52). Thus, the exemplary architecture does not significantly alter the trajectories of the given reference model as compared with the hedging approach.

In the next section, we provide an illustrative example using a hypersonic vehicle model and make comparisons between the exemplary control design and reference model with a hedged reference model.

An Illustrative Numerical Example

To elucidate an exemplary approach to the actuator dynamics problem in accordance with the present disclosure, we provide the following application to a hypersonic vehicle. Consider the uncertain hypersonic vehicle longitudinal dynamics given by $$\dot{x}(t) = \begin{bmatrix} -2.39 \times 10^{-1} & 1 & -2.95 \times 10^{-12} \\ 4.26 & -1.19 \times 10^{-1} & 0 \\ 1.31 \times 10^{-13} & 1 & -4.45 \times 10^{-14} \end{bmatrix} x(t) + \begin{bmatrix} -1.33 \times 10^{-4} \\ -1.84 \times 10^{-1} \\ 0 \end{bmatrix} (v(t) + W^T x_p(t)) \quad (53)$$

with zero initial conditions and the state vector being defined as $x(t) = [\alpha(t), q(t), \theta(t)]^T$, where $\alpha(t)$ denotes the angle-of-attack, $q(t)$ denotes the pitch rate, $\theta(t)$ denotes the pitch angle. The uncertainty is considered to be $W = [-100.01]^T$ such that it dominantly effects the stability derivative $C_m$, and the actuator output $\mathcal{V}(t)$ is given by the actuator dynamics $$\dot{v}(t) = -\lambda_e(\mathcal{V}(t) - \delta_e(t)), \quad (54)$$

where $\delta_e(t)$ denotes the elevator deflection and $\lambda_e$ is the actuator bandwidth which is scalar since we are considering a single input control channel. For this example, we design the proposed controller using the short-period approximation such that $x_p(t) = [\alpha(t), q(t)]^T$ with the respective system matrices $$A_p = \begin{bmatrix} -2.39 \times 10^{-1} & 1 \\ 4.26 & -1.19 \times 10^{-1} \end{bmatrix}, \quad (55)$$

$$B_p = \begin{bmatrix} -1.33 \times 10^{-4} \\ -1.84 \times 10^{-1} \end{bmatrix}. \quad (56)$$

LQR (linear-quadratic regulator) theory is used to design the nominal controller for both the proposed control design and the hedging based control design, with $E_p = [1; 0]$ such that a desired angle-of-attack command is followed. The controller gain matrix K is obtained using the highlighted augmented formulation, along with the weighting matrices Q=diag[2000, 25, 400000] to penalize the states and R=12:5 to penalize the control input, resulting in the following gain matrix $$K = [-135.9 \; -37.7 \; -178.9], \quad (57)$$

which has a desirable 60.4 degree phase margin and a crossover frequency of 6.75 Hz. In addition, the same learning gain matrix is used for both controllers given by $\Gamma$=diag[1000, 10]. For hedging based control design, the solution to $A_r^T P + P A_r + R_1 = 0$, where $A_r \triangleq A - BK$, is calculated with $R_1$=diag[1000, 1000, 2000]. In an exemplary controller in accordance with the present disclosure, we use the solution P from an LMI analysis.

Figure 3A:
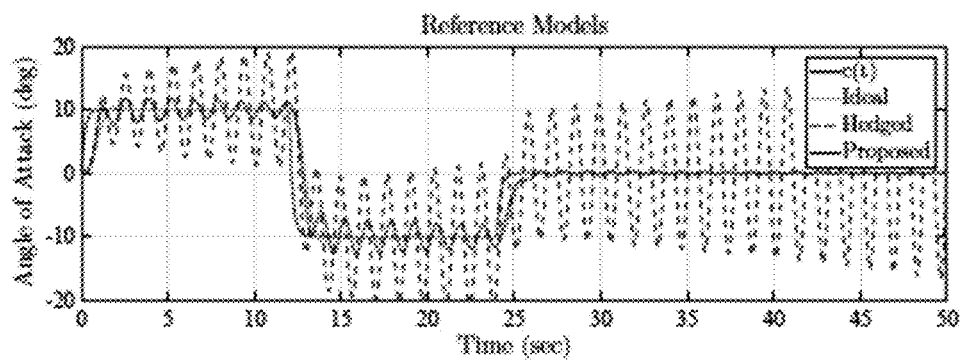
FIGS. 3A-C are plots showing an exemplary controller performance in accordance with embodiments of the present disclosure against a hedging based controller performance with respect to angle of attack measurements over time at a minimum calculated actuator bandwidth value of 7.55.
Figure 3B:
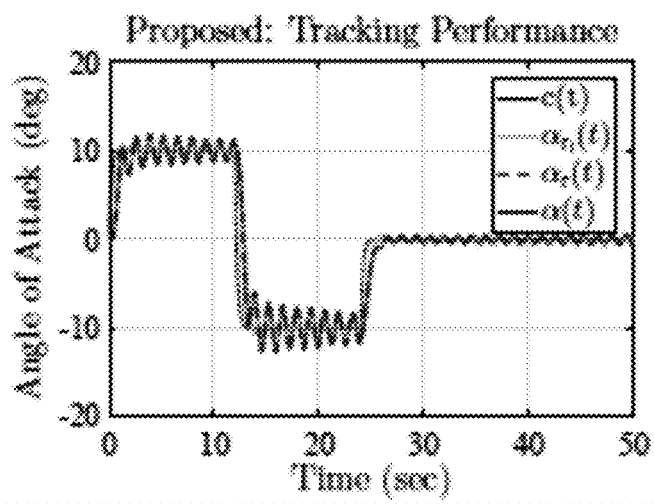
Figure 3C:
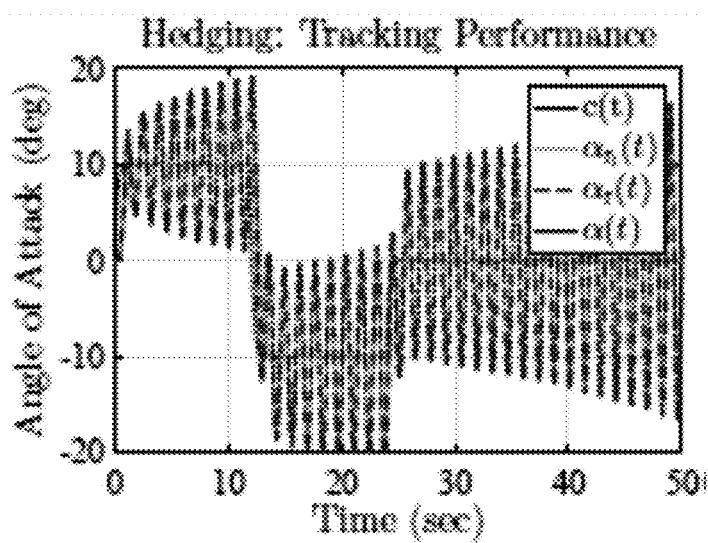
Figure 4A:
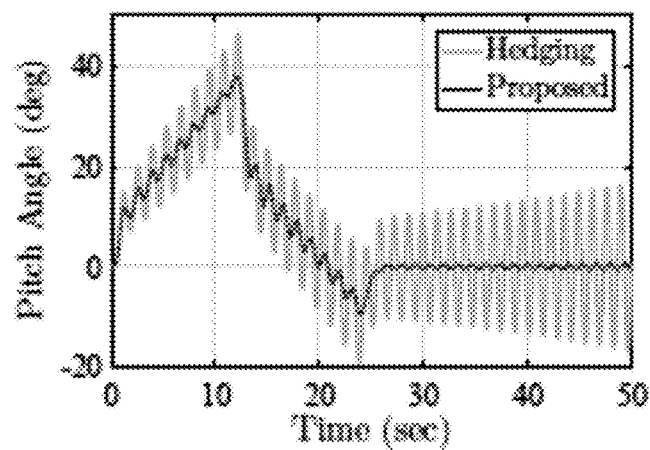
FIGS. 4A-C are plots showing an exemplary controller performance in accordance with embodiments of the present disclosure against a hedging based controller performance with respect to pitch angle, pitch rate, and control and actuator measurements over time at a minimum calculated actuator bandwidth value of 7.55.
Figure 4B:
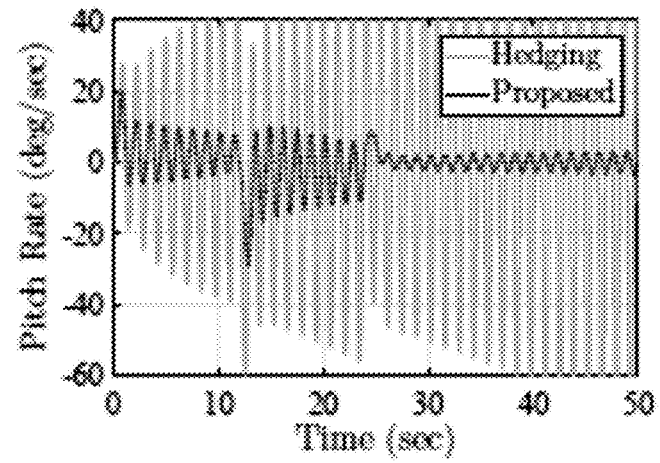
Figure 4C:
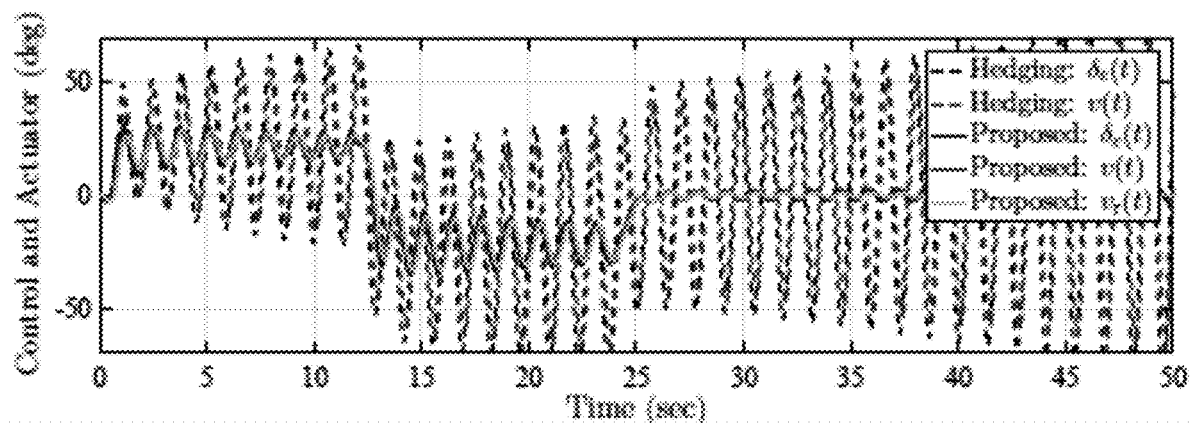

Using the LMI analysis in the previous Remark 4 (LMI Analysis for Command Following), the minimum actuator bandwidth for the elevator control surface is calculated to be $\lambda_e$=7.96. FIGS. 1A-2C show the exemplary controller performance and a hedging based controller performance at the LMI calculated minimum actuator bandwidth and a bandwidth value of $\lambda_e$=7.96. FIGS. 3A-4C show the exemplary controller performance and a hedging based controller performance at the LMI calculated minimum actuator bandwidth and a bandwidth value of $\lambda_e$=7.55. It can be seen from FIGS. 1A-C and 2A-C that at the calculated minimum bandwidth value both controllers remain stable and the desired angle-of-attack is tracked. It is clear though, that the exemplary controller outperforms the hedging based controller in that the exemplary reference model tracks the applied command with less initial oscillation. Once the bandwidth value reaches $\lambda_e$=7.55, as shown in FIGS. 3 and 4, the hedged reference model yields an unbounded trajectory, whereas the exemplary reference model remains bounded indicating superior performance compared with the hedging based controller.

In accordance with the present disclosure, embodiments of a new adaptive controller architecture for the stabilization and command following of uncertain dynamical systems with actuator dynamics are provided. To go beyond the (pseudo-control) hedging approach, it was shown that an exemplary architecture does not significantly alter the trajectories of a given reference model for stable adaptation such that it can achieve better performance as compared to the hedging approach. An application to a hypersonic vehicle model elucidated this result.

Figure 5:
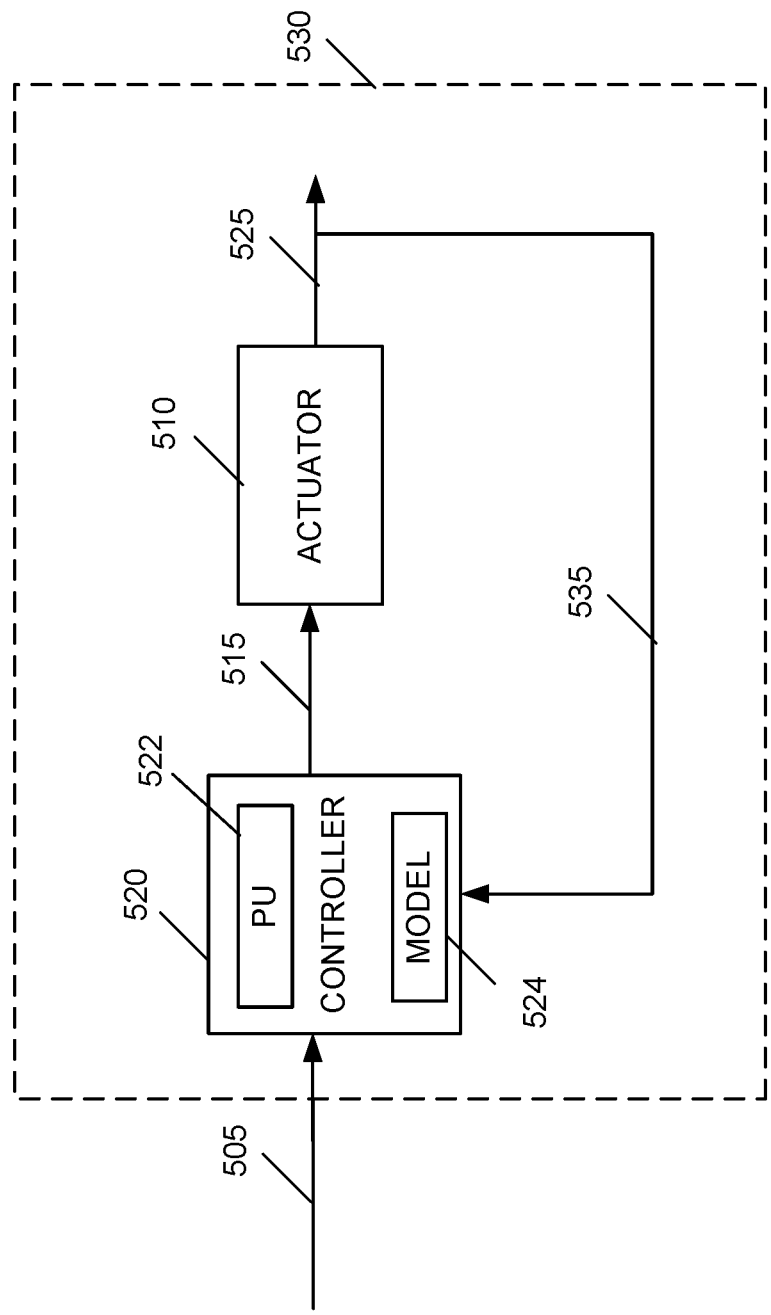
FIG. 5 is a block diagram of an exemplary actuator system with a controller in accordance with embodiments of the present disclosure.

Referring now to FIG. 5, an actuator unit or system 510 may be positioned next to an element of a structure or between two or more elements of a structure that make up a physical system 530. The actuator unit 510 is configured to react to commands of a controller 520 in addition to stimuli from the surroundings such as the physical system 530, in accordance with an exemplary embodiment of the present disclosure. The controller 520 is configured to receive an input or command 505 that is intended to have the actuator system 510 to produce a desired output 525 in accordance with the techniques and algorithms described in the present disclosure. For example, the controller 520 is configured to produce an actuator command 515 based on the dynamics of the actuator unit 510 that requests the actuator 510 to produce the desired output. To do so, the adaptive controller 520 also receives feedback 535 from the output signal of the actuator unit 510. Accordingly, the actuator command at least partially compensates for actuator dynamics in addition to other system dynamics, such that the response of the actuator system 510 is improved. In accordance with the present disclosure, an embodiment of the controller 520 may include computing circuitry or processing unit (PU) 522 configured to determine a reference model 524 of the physical system 530 capturing a desired (i.e., ideal) closed-loop dynamical system performance of the actuator system 510 in response to a command input 515. The circuitry 522 is configured to produce and adapt the actuator command by a process that does not alter the trajectories of the reference model such that a product of the actual actuator system and the reference model produces an output that is substantially equal to a given command input. As an example, the controller 520 of the actuator system 510 may compute what output signal is needed to be applied to achieve a desired force, velocity, acceleration and/or displacement between the actuator unit and the structure (such as a hypersonic vehicle, as an example, among others).

It should be emphasized that the above-described embodiments of the present disclosure are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of this disclosure and protected by the following claims.

Therefore, at least the following is claimed:

1. An actuator system for a vehicle, comprising:
   an actuator unit comprising an actuator positioned next to a structure, where the actuator unit receives and reacts to an actuator command for the actuator; and
   an adaptive controller comprising computing circuitry that, in response to a command input for the actuator, produces the actuator command based on a reference model of a vehicle that includes the actuator unit and the structure, wherein the computing circuitry outputs the actuator command to the actuator unit which reacts to the actuator command, wherein the reference model is given by:

$$\begin{bmatrix} \dot{x}_r(t) \\ \dot{v}_r(t) \end{bmatrix} = \begin{bmatrix} A + B\hat{W}^T(t)N & B \\ -M(K + \hat{W}(t)N) & -M \end{bmatrix} \begin{bmatrix} x_r(t) \\ v_r(t) \end{bmatrix} + \begin{bmatrix} B_r \\ 0_{m \times n_c} \end{bmatrix} c(t),$$

where c(t) is the command input, $B_r \triangleq [0_{n_c \times n_p}, -I_{n_c \times n_c}]^T$, $x_r(t)$ is a reference state vector, $\mathcal{V}_r(t)$ is a reference actuator output, $$A \triangleq \begin{bmatrix} A_p & 0_{n_p \times n_c} \\ E_p & 0_{n_c \times n_c} \end{bmatrix}, B \triangleq [B_p^T, 0_{m \times n_p}]^T,$$

$A_p$ is a known system matrix, $B_p$ is a known control input matrix, $E_p$ is a selection matrix, $\hat{W}(t)$ is an estimate of an unknown weight matrix W, $N=[I_{n_p \times n_p}, 0_{n_p \times n_c}]$, K is a gain matrix and M represents actuator bandwidth, $0_{m \times n_c}$, $0_{n_c \times n_p}$, $0_{n_p \times n_c}$, $0_{n_c \times n_c}$, $0_{m \times n_p}$ are zero matrices, and $I_{n_c \times n_c}$, $I_{n_p \times n_p}$ are an identity matrices, and wherein the actuator command is given by:

$$u(t) = -Kx(t) - \hat{W}^T(t)Nx(t),$$

where x(t) is a system state vector and $\hat{W}(t)$ satisfies:

$$\dot{\hat{W}}(t) = \gamma \text{Proj}_m[\hat{W}(t), \sigma(\cdot)PG],$$

where γ is a learning rate, $\sigma(\cdot) = [Nx(t)e_x^T(t), Nx(t)e\mathcal{V}^T(t)]$, $e_x(t) \triangleq x(t) - x_r(t)$, $e\mathcal{V}(t) \triangleq \mathcal{V}(t) - \mathcal{V}_r(t)$, P is a solution of a matrix inequality, $G = [B^T, 0_{m \times m}]^T$, and $\mathcal{V}(t)$ is the actuator output.

2. The system of claim 1, wherein the vehicle comprises an uncertain dynamical system.

3. The system of claim 2, wherein the reference model incorporates adaptive feedback from the actuator unit to stabilize the uncertain dynamical system.

4. The system of claim 1, wherein the vehicle is a hypersonic vehicle.

5. The system of claim 1, wherein the vehicle is an aircraft.

6. A method for adaptive control of an actuator unit comprising:
  positioning the actuator unit comprising an actuator next to a physical structure of a vehicle;
  determining a reference model of the vehicle that includes the actuator unit, wherein the reference model depicts a closed-loop dynamical system performance of the vehicle, wherein the reference model is given by:

$$\begin{bmatrix} \dot{x}_r(t) \\ \dot{v}_r(t) \end{bmatrix} = \begin{bmatrix} A + B\hat{W}^T(t)N & B \\ -M(K + \hat{W}(t)N) & -M \end{bmatrix} \begin{bmatrix} x_r(t) \\ v_r(t) \end{bmatrix} + \begin{bmatrix} B_r \\ 0_{m \times n_c} \end{bmatrix} c(t),$$

where c(t) is a command input, $B_r \triangleq [0_{n_c \times n_p}, -I_{n_c \times n_c}]^T$, $x_r(t)$ is a reference state vector, $\mathcal{V}_r(t)$ is a reference actuator output, $$A \triangleq \begin{bmatrix} A_p & 0_{n_p \times n_c} \\ E_p & 0_{n_c \times n_c} \end{bmatrix}, B \triangleq [B_p^T, 0_{m \times n_p}]^T,$$

$A_p$ is a known system matrix, $B_p$ is a known control input matrix, $E_p$ is a selection matrix, $\hat{W}(t)$ is an estimate of an unknown weight matrix W, $N=[I_{n_p \times n_p}, 0_{n_p \times n_c}]$, K is a gain matrix and M represents actuator bandwidth, $0_{m \times n_c}$, $0_{n_c \times n_p}$, $0_{n_p \times n_c}$, $0_{n_c \times n_c}$, $0_{m \times n_p}$ are zero matrices, and $I_{n_c \times n_c}$, $I_{n_p \times n_p}$ are an identity matrices;
  receiving, by controller circuitry, a command input for the actuator unit; and
  outputting, by the controller circuitry, an actuator command to the actuator unit which reacts to the actuator command, the actuator command based on the reference model of the vehicle, wherein the actuator command is given by:

$$u(t) = -Kx(t) - \hat{W}^T(t)Nx(t),$$

where x(t) is a system state vector and $\hat{W}(t)$ satisfies:

$$\dot{\hat{W}}(t) = \gamma \text{Proj}_m[\hat{W}(t), \sigma(\cdot)PG],$$

where γ is a learning rate, $\sigma(\cdot) = [Nx(t)e_x^T(t), Nx(t)e\mathcal{V}^T(t)]$, $e_x(t) \triangleq x(t) - x_r(t)$, $e\mathcal{V}(t) \triangleq \mathcal{V}(t) - \mathcal{V}_r(t)$, P is a solution of a matrix inequality, $G = [B^T, 0_{m \times m}]^T$, and $\mathcal{V}(t)$ is the actuator output.

7. The method of claim 6, wherein the vehicle comprises an uncertain dynamical system.

8. The method of claim 7, further comprising incorporating adaptive feedback from the actuator unit within the reference model to stabilize the uncertain dynamical system.

9. The method of claim 6, wherein the vehicle is a hypersonic vehicle.

10. The method of claim 6, wherein the vehicle is an aircraft.

* * * * *